(12) United States Patent
Moreton et al.

(10) Patent No.: US 6,600,488 B1
(45) Date of Patent: *Jul. 29, 2003

(54) TESSELLATION SYSTEM, METHOD AND COMPUTER PROGRAM PRODUCT WITH INTERIOR AND SURROUNDING MESHES

(75) Inventors: Henry P. Moreton, Woodside, CA (US); Douglas H. Rogers, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/287,988

(22) Filed: Nov. 4, 2002

Related U.S. Application Data

(63) Continuation of application No. 09/655,103, filed on Sep. 5, 2000, now Pat. No. 6,504,537.

(51) Int. Cl.$^7$ .............................................. G06T 15/30
(52) U.S. Cl. ....................................................... 345/423
(58) Field of Search ................................ 345/423, 421, 345/589, 419, 420; 700/98; 703/1, 2

(56) References Cited

U.S. PATENT DOCUMENTS

| | | | |
|---|---|---|---|
| 4,933,889 A | 6/1990 | Meshkat et al. ............ 364/578 |
| 5,448,687 A | 9/1995 | Hoogerhyde et al. ........ 395/125 |
| 5,553,206 A | 9/1996 | Meshkat ..................... 395/123 |
| 5,617,322 A | 4/1997 | Yokota .................. 364/468.04 |
| 5,903,273 A | 5/1999 | Mochizuki et al. ......... 345/423 |
| 5,936,869 A | 8/1999 | Sakaguchi et al. .......... 364/578 |
| 6,271,861 B1 | 8/2001 | Sargent et al. .............. 345/432 |
| 6,362,819 B1 | 3/2002 | Dalal et al. ................. 345/423 |
| 6,504,537 B1 * | 1/2003 | Moreton et al. ............ 345/423 |

* cited by examiner

Primary Examiner—Mark Zimmerman
Assistant Examiner—Huedung X. Cao
(74) Attorney, Agent, or Firm—Silicon Valley IP Group; Kevin J. Zilka

(57) ABSTRACT

A system, method and article of manufacture are provided for decomposing surfaces for rendering purposes during computer graphics processing. Initially, an interior mesh of primitives is defined in a surface to be rendered. Next, a plurality of surrounding meshes is defined along sides of the interior mesh. The exterior sides of the surrounding meshes each include a plurality of equally sized segments and at least one fractional segment that is a fraction of the equally sized segments. With this configuration, a pattern of triangles is used that permits the number of triangles to be varied continuously from frame to frame while accommodating incremental evaluation techniques such as forward differencing without visual artifacts such as popping.

35 Claims, 10 Drawing Sheets

TESSELLATION SYSTEM, METHOD AND COMPUTER PROGRAM PRODUCT WITH INTERIOR AND SURROUNDING MESHES

This is a Continuation application of prior Application Ser. No. 09/655,103 filed on Sep. 5, 2000, now issued as U.S. Pat. No. 6,504,537, the disclosure of which is incorporated herein by reference.

FIELD OF THE INVENTION

The present invention relates to computer graphics, and more particularly to constructing primitives for rendering purposes in a computer graphics pipeline.

BACKGROUND OF THE INVENTION

In computer graphic systems, rendering and displaying three-dimensional graphics typically involves many calculations and computations. For example, to render a three dimensional object, a set of coordinate points or vertices that define a surface to be rendered must be formed. Vertices can be joined to form polygons, or primitives, that approximate the surface of the object to be rendered and displayed.

Tessellation refers to the process of decomposing the surface into simpler primitives such as triangles or quadrilaterals. Prior Art FIG. 1 illustrates the results of one example of a representative conventional tessellation process on a surface 100. First, a plurality of parallel, equally spaced curves 102 are defined which span a width of the surface 100 and coincide with a plurality of vertices 104. Thereafter, the vertices 104 are connected in a sequential order between each of the curves 102 from one side of the surface to an opposite side. Resulting is a mesh, or group, of a plurality of equally sized primitives, i.e. triangles, that are ready to be rendered.

While few problems arise when rendering and viewing these meshes individually, complications arise when adjacent meshes are rendered. These difficulties arise from the fact that the surface being rendered often are very dynamic, and the meshes utilize a very symmetric, rigidly structured tessellation pattern. For example, when attempting to tessellate a surface that fades off in the -Z direction, the number of vertices along the edges of adjacent meshes may be different and thus not be aligned, leaving cracks or gaps therebetween.

It should be noted that a separate problem arises when rendering individual meshes where no cracking can occur. This problem occurs when the tessellation must be varied from frame to frame to compensate for changing viewing conditions, i.e. the image of the surface in screen space is becoming larger or smaller, and the appropriate number of triangles is changing. Standard conventional schemes must introduce triangles in integer quanta.

The visual ramification of the aforementioned cracks is commonly referred to as "cracking." In order to remove the cracks between different meshes which are joined together, graphic systems require costly computationally intensive techniques. Thus, the prior art graphic systems are traditionally inefficient for rendering two-dimensional representations from three-dimensional surfaces. Further, typical prior art implementations avoid cracking by stitching up the boundary between meshes. These solutions experience unwanted "popping" when the tessellations are varied.

There is thus a need for a tessellation process that avoids problems such as popping and cracking, and the computationally intensive techniques required to solve such problems.

DISCLOSURE OF THE INVENTION

A system, method and article of manufacture are provided for decomposing surfaces for rendering purposes during computer graphics processing. Initially, an interior mesh of primitives is defined in a surface to be rendered. Next, a plurality of surrounding meshes is defined along sides of the interior mesh.

The exterior sides of the surrounding meshes each include a plurality of equally sized segments and at least one fractional segment that is a fraction of the equally sized segments. With this configuration, a pattern of triangles is used that permits the number of triangles to be varied continuously from frame to frame while accommodating incremental evaluation techniques such as forward differencing without visual artifacts such as popping.

In one embodiment of the present invention, the interior mesh may include a predetermined number of rows and columns. Further, the interior sides of the surrounding meshes may each include a number of segments equal to the corresponding predetermined number of rows or columns of the interior mesh. Further, the exterior sides of the surrounding meshes may each have a number of segments equal to, greater than, or less than the corresponding predetermined number of rows or columns of the interior mesh.

In one aspect of the present invention, the interior mesh and the surrounding meshes may define one of a plurality of equally sized and shaped portions of the surface. Also, the fractional segments of each of the portions may be positioned adjacent a midpoint of a side of the surface. As an option, a width of the surrounding meshes may be equal to a width of the rows or columns of the interior mesh.

In another embodiment of the present invention, the interior mesh may include a transition mesh situated along sides of the interior mesh. Optionally, such transition mesh may have dimensions which are unequal to dimensions of the interior mesh. Further, the exterior sides of the surrounding meshes may each include a pair of fractional segments that are a fraction of the equally sized segments, and may be positioned at ends of the exterior sides of the surrounding meshes.

These and other advantages of the present invention will become apparent upon reading the following detailed description and studying the various figures of the drawings.

BRIEF DESCRIPTION OF THE DRAWINGS

The foregoing and other aspects and advantages are better understood from the following detailed description of a preferred embodiment of the invention with reference to the drawings, in which.

Prior Art

DESCRIPTION OF THE PREFERRED EMBODIMENTS

Figure 1:
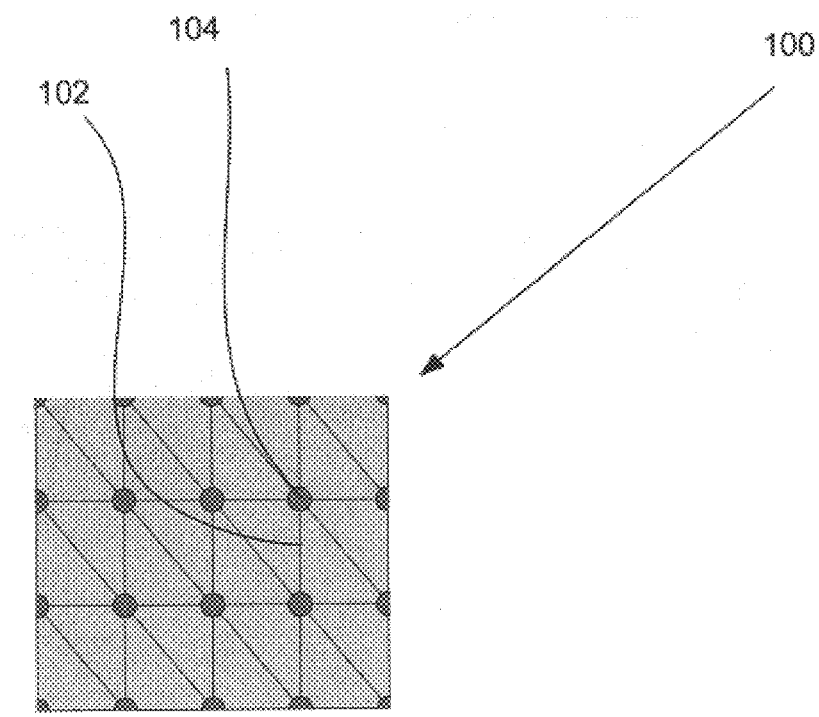
FIG. 1 illustrates a prior art tessellation configuration.
Figure 1A:
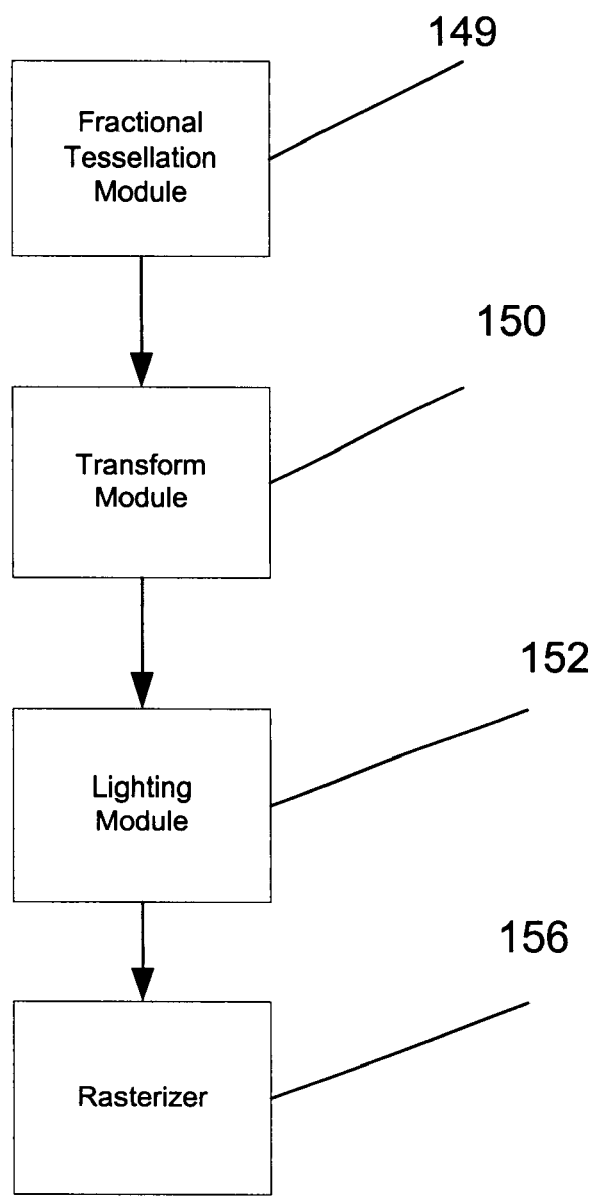
FIG. 1A illustrates a hardware implementation in accordance with one embodiment of the present invention.

Prior Art FIG. 1 illustrates a prior art tessellation configuration. FIG. 1A illustrates a hardware implementation in accordance with one embodiment of the present invention. As shown, included are a fractional tessellation module 149, a transform module 150, lighting module 152, and a rasterization module 156.

During operation, the fractional tessellation module 149 decomposes surfaces for rendering purposes during computer graphics processing. The specific manner in which this is accomplished will be set forth in greater detail during reference to the following figures.

A set of vertices are then received by the transform module 150 which may be used to perform scaling, rotation, and projection of the vertices from their local or model coordinates to the two dimensional window that will be used to display the rendered object. The lighting module 152 sets the color and appearance of the vertices based on various lighting schemes, light locations, ambient light levels, materials, and so forth. Accordingly, the transform module 150 and lighting module 152 operate in a manner that is well known to those of ordinary skill in the art.

The rasterization module 156 rasterizes or renders vertices that have previously been transformed and/or lit. The rasterization module 156 renders the object to a rendering target which can be a display device or intermediate hardware or software structure that in turn moves the rendered data to a display device.

Figure 2:
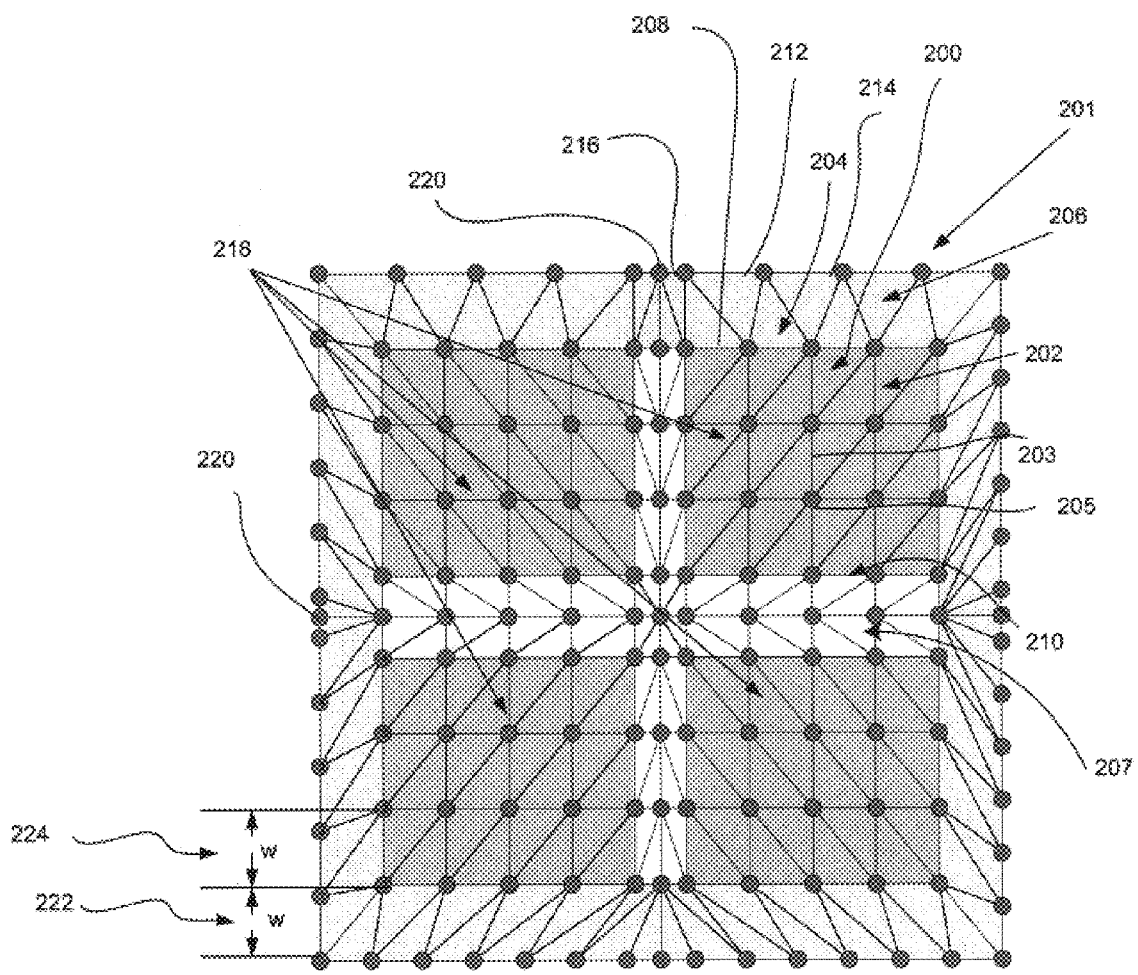
FIG. 2 is a diagram illustrating a fractional tessellation pattern configured in accordance with one embodiment of the present invention.

FIG. 2 is a diagram illustrating a fractional tessellation pattern configured in accordance with one embodiment of the present invention. As shown, an interior mesh 200 of primitives is defined in a surface 201, or "patch," to be rendered. Such interior mesh 200 includes a plurality of strip curves 203 which are configured to define a predetermined number of rows 202 and columns 204. The strip curves 203 intersect at vertices 205.

Circumnavigating the interior mesh 200 is a plurality of surrounding meshes 206 which are defined along sides of the interior mesh 200. The surrounding meshes 206 serve to accommodate for any change of tessellation, or discontinuity, between the interior mesh 200 and the perimeter of the surface 201. In addition to the surrounding mesh 206, there are meshes 207 crossing the interior of the patch, which also border regular mesh 200. These meshes permit the number of rows/columns in the interior meshes 200, to be varied (increased/decreased) without popping. The meshes 207 are a fraction of the height/width of the rows/columns of 200.

In one embodiment, the interior sides 208 of the surrounding meshes 206 each include a number of segments 210 equal to the corresponding predetermined number of rows or columns of the interior mesh 200. It should be noted that the segments 210 are defined as portions of the strip curves 203 situated between the vertices 205. Further, the exterior sides 212 of the surrounding meshes 206 each include a plurality of equally sized segments 214 and at least one fractional segment 216 that is a fraction of the equally sized segments 214.

With this configuration, a pattern of triangles is used that permits the number of triangles to be varied continuously from frame to frame while accommodating incremental evaluation techniques such as forward differencing. The scheme permits new vertices to be introduced (removed) at existing vertices, thus avoiding popping. Further, the independent tessellation factors permit applications to avoid cracking. Because the tessellation pattern is symmetric, no gaps can occur if equal tessellation factors are specified.

The foregoing description has been focused on a single interior mesh 200 with four surrounding meshes 206. In another aspect of the present invention, the interior mesh 200 and the surrounding meshes 206 may define one of a plurality of equally sized and shaped portions 218 of the surface 201. Also, the fractional segments 216 of each of the portions 218 may be positioned adjacent a midpoint 220 of a side of the surface 201. As an option, a width 222 of the surrounding meshes 206 may be equal to a width 224 of the rows or columns of the interior mesh 200. Note FIG. 2.

Figure 3:
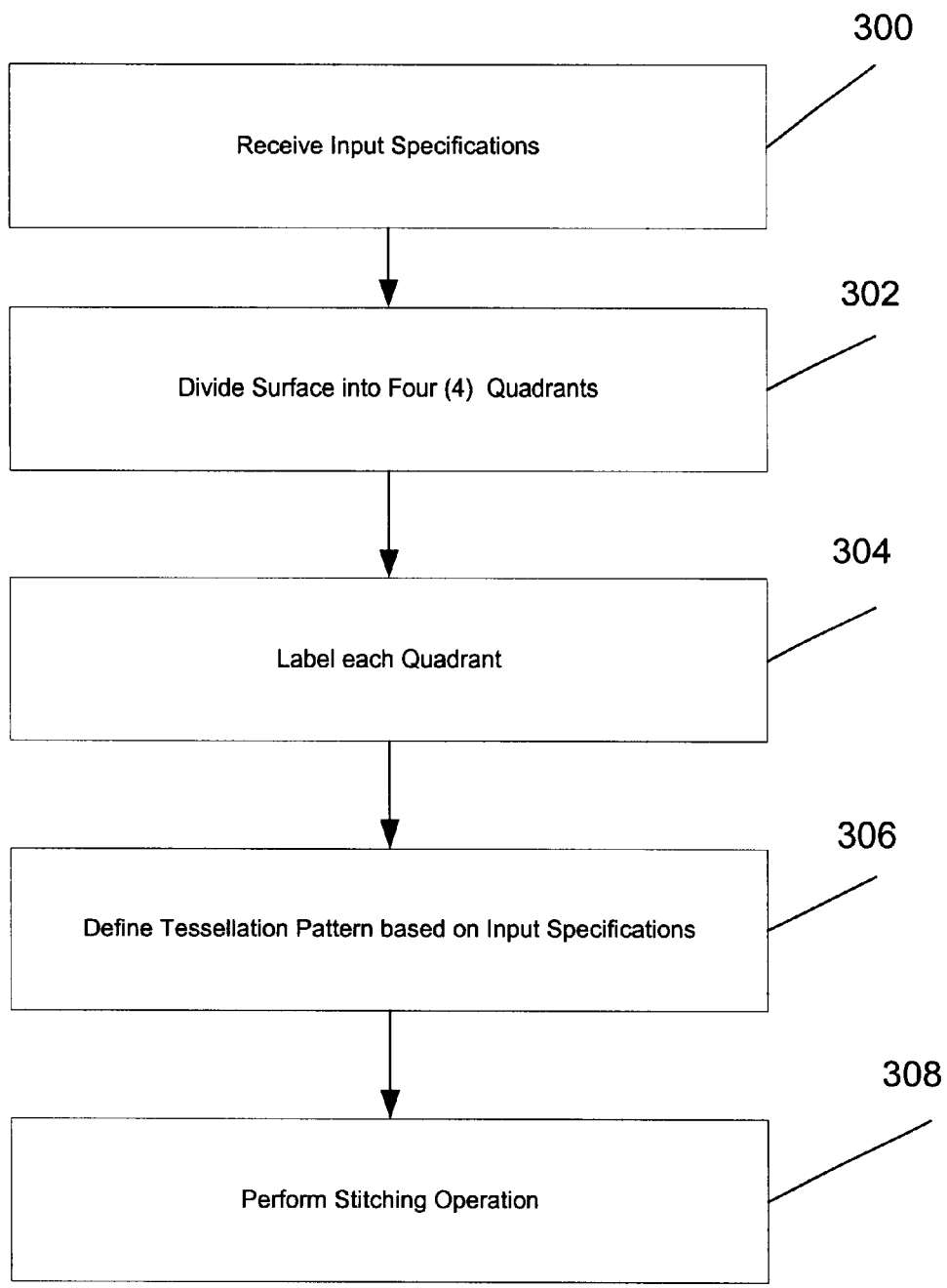
FIG. 3 is a flow diagram illustrating the various operations associated with generating the fractional tessellation set forth in FIG. 2.

FIG. 3 is a flow diagram illustrating the various operations associated with generating the fractional tessellation set forth in FIG. 2. First, specifications are received in operation 300. Such specifications may be provided by an application program interface, and include a specific number of segments 210 along sides of the surface 201. Also included are a number of rows and columns to be included in the interior mesh 200.

Figure 3A:
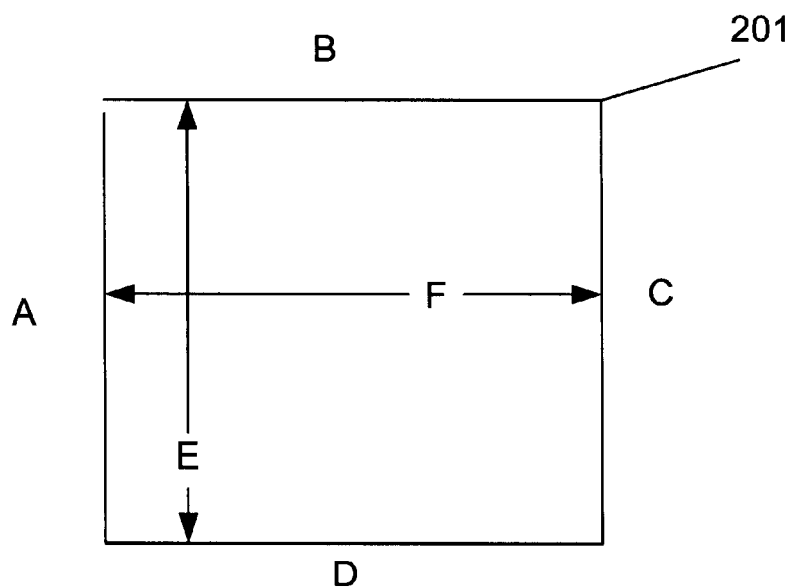
FIG. 3A illustrates the surface prior to being divided into quadrants in accordance with operation 302 of FIG. 3.
Figure 3B:
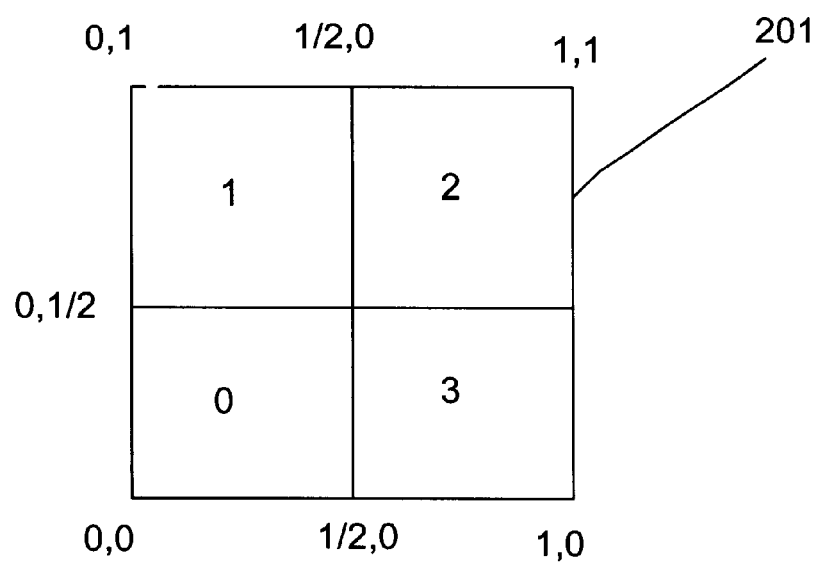
FIG. 3B illustrates the surface after being divided into quadrants in accordance with operation 302 of FIG. 3.

Next, in operation 302, the surface is divided into four (4) quadrants. FIG. 3A illustrates the surface 201 prior to being divided into quadrants in accordance with operation 302 of FIG. 3. As shown, each of the sides of the surface 201 is defined as A, B, C, and D; and the vertical and horizontal dimensions of the surface 201 are defined as E and F, respectively. FIG. 3B illustrates the surface 201 after being divided into quadrants in accordance with operation 302 of FIG. 3. It should be noted that the surface 201 is divided at the parametric midpoints to generate quadrants 0, 1, 2, and 3.

Figure 3C:
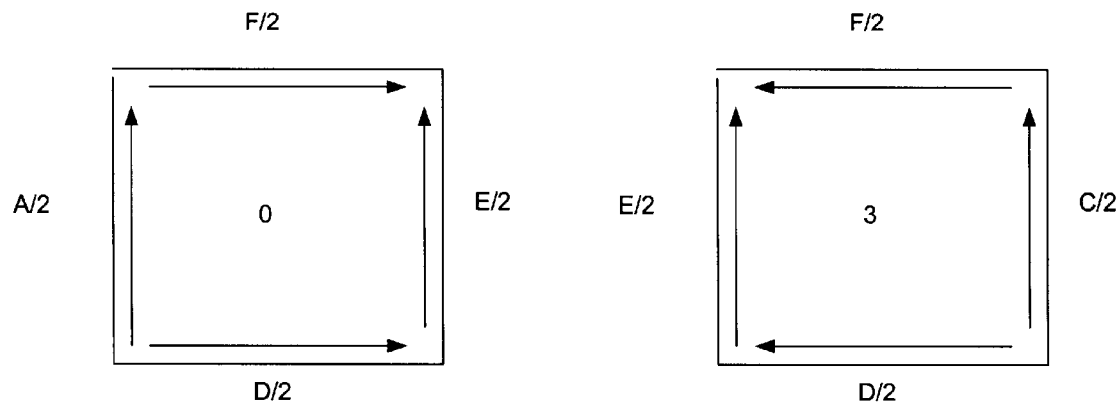
FIG. 3C illustrates the labeling of the quadrants in accordance with operation 304 of FIG. 3.

With continuing reference to FIG. 3, the quadrants defined in operation 302 are then labeled in operation 304. FIG. 3C illustrates the labeling of the quadrants in accordance with operation 304 of FIG. 3. As shown, quadrant 0 includes sides designated as A/2, F/2, D/2 and E/2 which correspond to their length with respect to the corresponding sides/dimensions of the surface 201 set forth in FIG. 3A. In a similar manner, quadrant 3 includes sides designated as E/2, F/2, D/2 and C/2. Quadrants 1 and 2 may be labeled in a similar manner. It should be noted that the direction of rendering may optionally be defined at this point. Specifically, tessellation and rendering are designated to occur along each side in a direction toward a midpoint of a side of the surface 201 (for exterior sides A, B, C, D), or toward a center of the surface 201 (for interior sides E, F). Note the direction of arrows in FIG. 3C.

Subsequently, in operation 306 of FIG. 3, the tessellation pattern is defined based on the input specifications and the labeling of operation 304. In particular, the vertex arrangement of the interior mesh 200 is uniformly defined simply by the number of rows and columns indicated by the input specifications received in operation 300. Further, the tessellation pattern of the sides of each quadrant is defined by determining a number of the equally sized segments 214 and a length of the fractional segment 216.

In the case of quadrant 0 of FIGS. 3B and 3C, the number of equally sized segments 214 is determined by calculating an integer component of each side. For example, in the case of side A, the number of segments associated therewith is Int(A). Further, the length of the fractional segment 216 is determined by calculating the fractional component of each side, Frac(A)=A−Int(A). Similar calculations may be made for each side of each quadrant. Also, such values may be verified by utilizing Equation #1 set forth below.

$$Int(A)*1/A+[Frac(A)]/A=1 \qquad \text{Equation \#1}$$

Figure 3D:
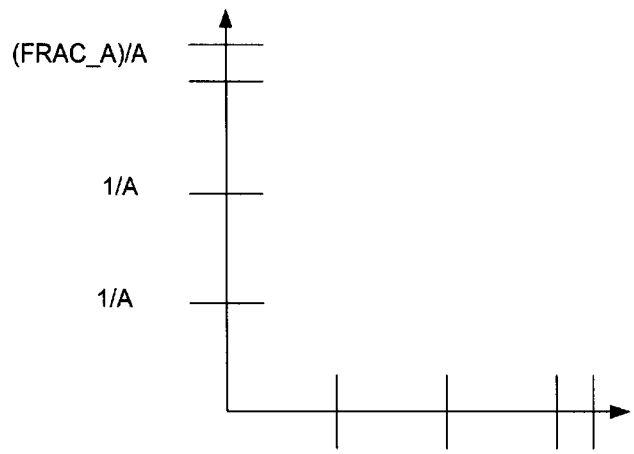
FIG. 3D illustrates the manner in which the vertices and segments are positioned along each side of the quadrants in accordance with the specified direction of rendering.

FIG. 3D illustrates the manner in which the vertices 205 and segments 214, 216 are positioned along each side of the quadrants in accordance with the specified direction of rendering. As shown, the fractional segments 216 are positioned adjacent an endpoint of the rendering.

With the vertices 205 and segments 214, 216 of the interior mesh 200 and the sides of the quadrant defined, the vertices are stitched in operation 308 of FIG. 3. This is carried out by starting at an end vertex of a side of the interior mesh 200, where the end vertex is situated opposite the fractional segment 216. The vertices of the interior mesh and the exterior side of the surface 201 are then connected, or "stitched," in a zigzag manner.

Figure 3E:
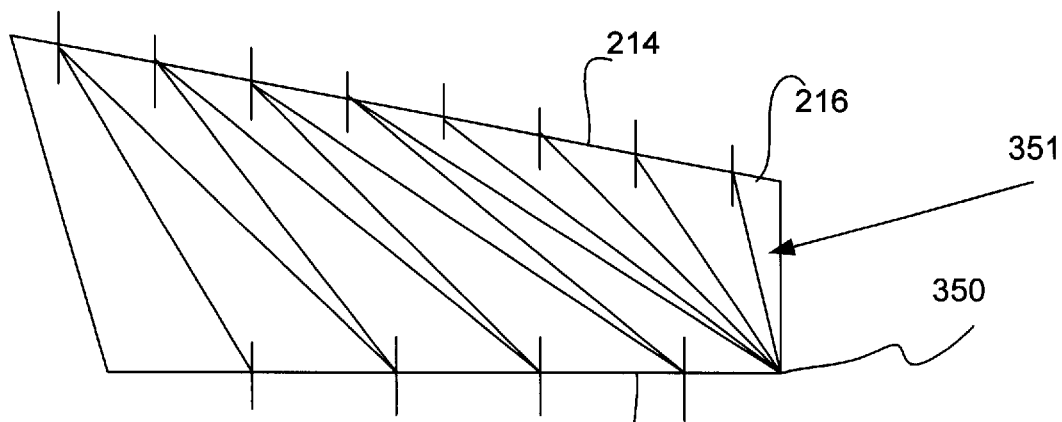
FIGS. 3E, 3F, and 3G illustrate stitching patterns for situations where the exterior sides of the surrounding meshes have a number of segments greater than, less than, or equal to the corresponding predetermined number of rows or columns of the interior mesh.
Figure 3F:
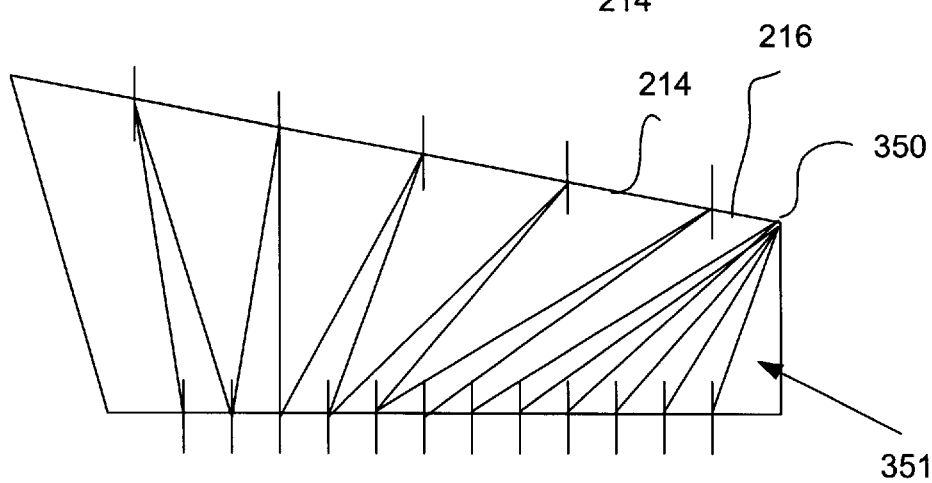
Figure 3G:
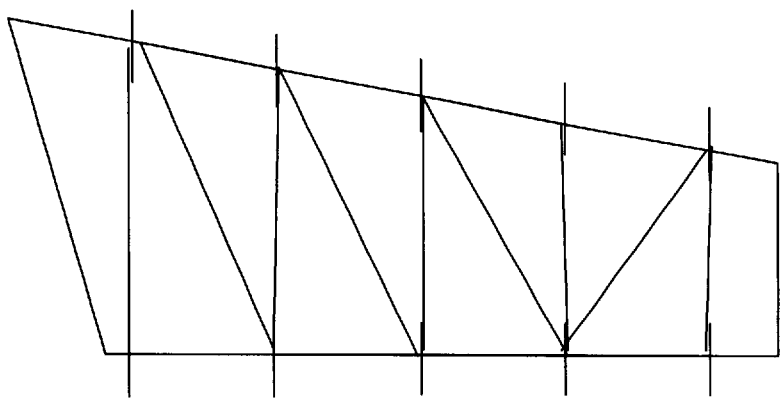

FIGS. 3E, 3F, and 3G illustrate stitching patterns for situations where the exterior sides of the surrounding meshes 206 have a number of segments 214, 216 greater than, less than, or equal to the corresponding predetermined number of rows or columns of the interior mesh 200, respectively. As shown in FIGS. 3E and 3F, upon running out of vertices, the last vertex 350 is coupled to any remaining vertices in a "fan out" pattern 351. As shown in FIG. 3G, such fan out pattern 351 may not be necessary in the situation where the surrounding meshes 206 have a number of segments 214, 216 equal to the corresponding predetermined number of rows or columns of the interior mesh 200.

Figure 4:
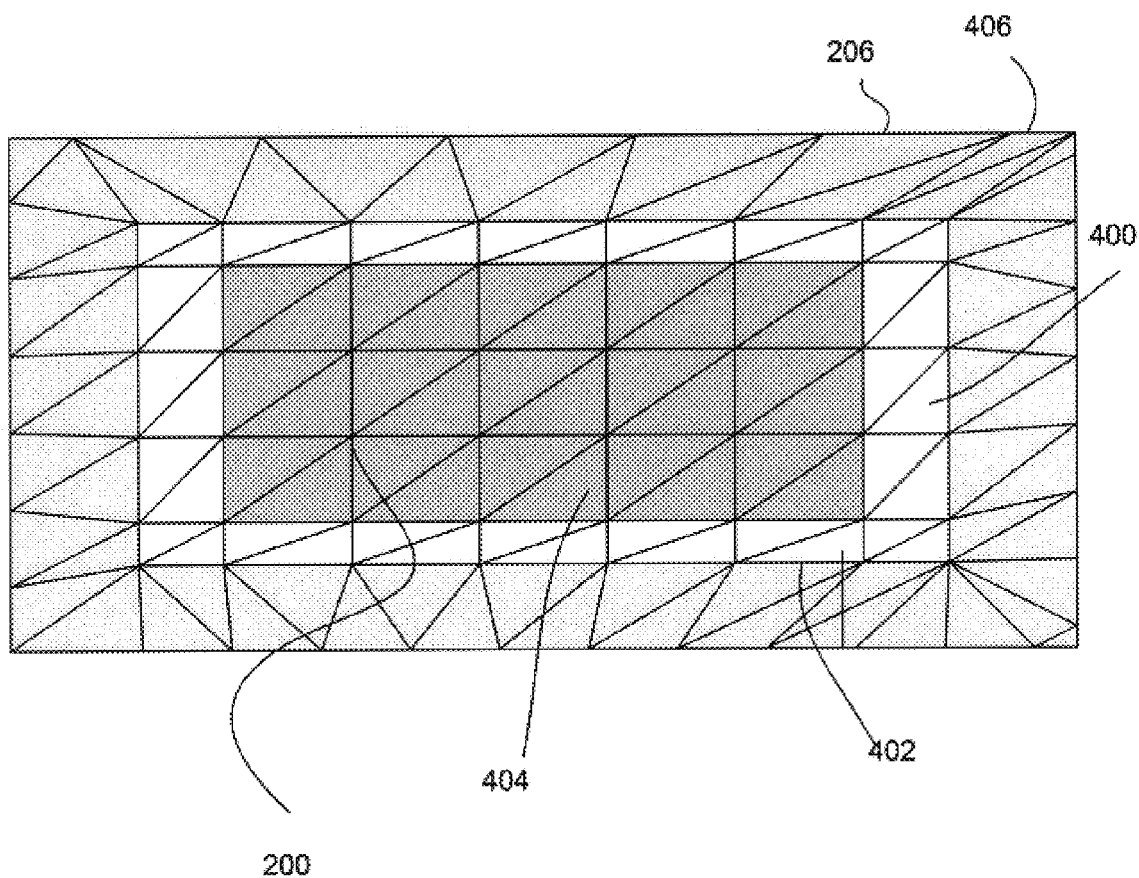
FIG. 4 illustrates an alternate configuration including an intermediate mesh between the interior mesh and the surrounding meshes.

FIG. 4 illustrates an alternate configuration including a transition mesh 400 between the interior mesh 200 and the surrounding meshes 206. As shown, the interior mesh 200 may include a transition mesh 400 situated along sides of the interior mesh 200. Optionally, such transition mesh 400 may have dimensions which are unequal to dimensions of the interior mesh 200. For example, the blocks 402 of the transition mesh 400 may be larger or smaller than the blocks 404 defined by the interior mesh 200.

Further, the exterior sides of the surrounding meshes 206 may each include two or more (preferably an even number) fractional segments 406 that are a fraction of the equally sized segments. Unlike the previous embodiment, the fractional segments may be positioned at both ends of the exterior sides of the surrounding meshes 206. The present embodiment thus affords one single interior mesh 200 as opposed to the multiple interior meshes 200 of the previous embodiment of FIG. 2. Any discrepancies are then handled by the transition mesh 400.

Figure 5:
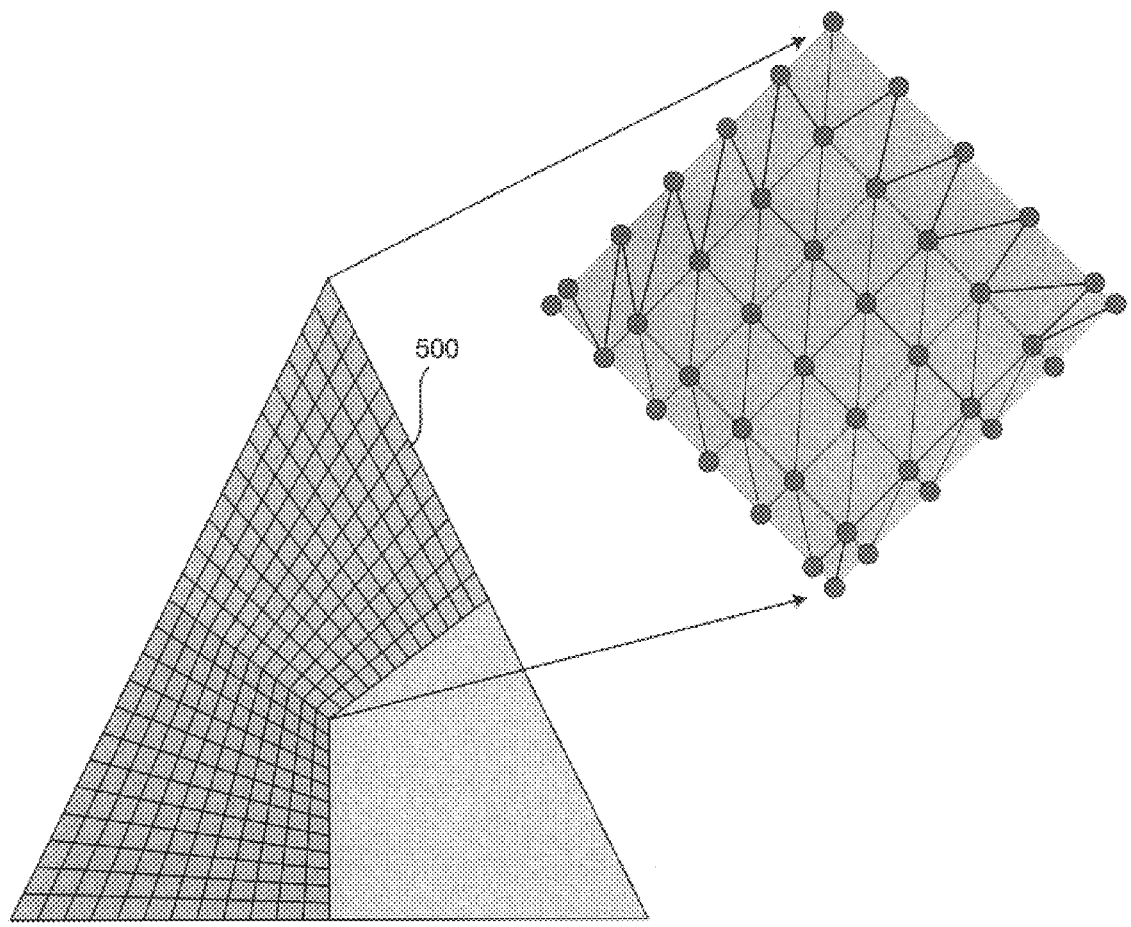
FIG. 5 illustrates a fractional tessellation patterning scheme employed for decomposing a triangular patch in accordance with one embodiment of the present invention.

FIG. 5 illustrates the fractional tessellation patterning scheme employed for decomposing a triangular patch 500 in accordance with one embodiment of the present invention. As shown, the triangular patch 500 may be subdivided into a plurality of patches in a manner similar to the subdivision of the square patch of FIG. 2. For more information on decomposing triangular patches using quadrilateral patches, reference may be made to a co-pending application entitled "SYSTEM, METHOD AND ARTICLE OF MANUFACTURE FOR RENDERING TRIANGULAR PATCHES USING HARDWARE EQUIPPED FOR HANDLING QUADRILATERAL PATCHES" filed coincidently herewith under docket number NVIDP017/P9000180 naming Henry P. Moreton as inventor, and which is incorporated herein by reference in its entirety.

It should be noted that the present invention may be implemented in even and odd parity. By even and odd parity, it is meant that there are either always an even number of segments on an external side, or an odd number of segments. In the case of an even number the number of rows and columns of the interior mesh is fractional albeit strictly rows and columns. In the odd parity case, there is also a regular mesh on the interior, also fractional. In the even parity case, the fractional rows/columns cross the center. In the odd case the fractional rows is at the perimeter of the regular mesh.

Figure 6:
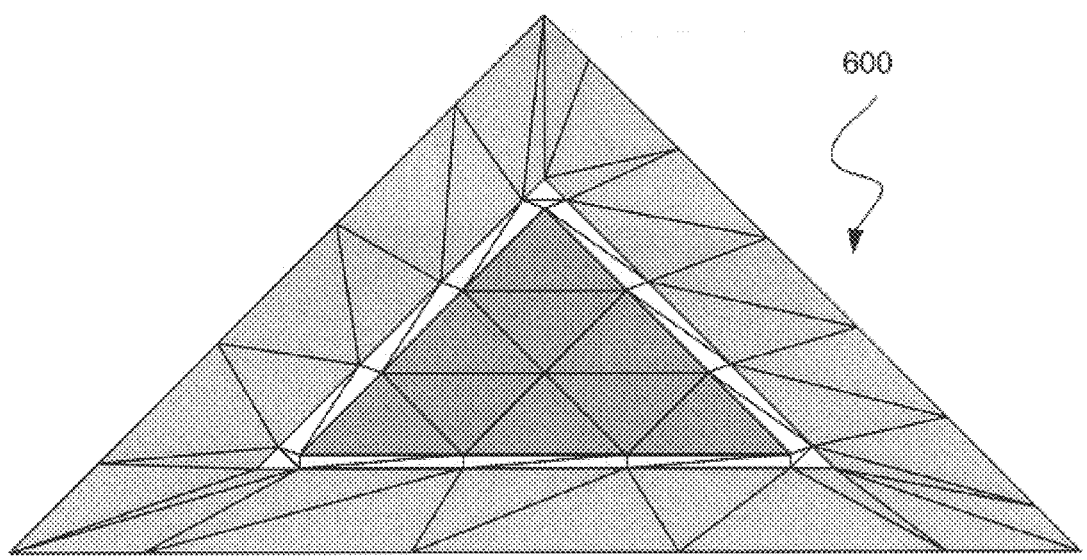
FIG. 6 illustrates an alternate tessellation scheme for triangular patches that does not require conversion to tensor products.

FIG. 6 illustrates a tessellation scheme 600 for triangular patches that does not require conversion to tensor products. It should be noted that the even parity scheme requires tensor products, and the odd parity scheme uses triangular patches.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for decomposing surfaces for rendering during computer graphics processing, comprising:
   defining an interior mesh of primitives in a surface to be rendered; and
   defining a plurality of surrounding meshes along sides of the interior mesh;
   wherein exterior sides of the interior mesh each include a plurality of equally sized segments.

2. The method as recite in claim 1, wherein the segments of the exterior sides of the surrounding meshes are symmetric around a middle of the exterior sides of the surrounding meshes.

3. The method as recited in claim 1, wherein the segments of the exterior sides of the interior mesh are symmetric around a middle of the exterior sides of the interior mesh.

4. The method as recited in claim 1, wherein each interior vertex of the interior mesh is connected to at least six other vertices of the interior mesh.

5. The method as recited in claim 1, wherein the exterior sides of the interior mesh each include at least one fractional segment that is a fraction of the equally sized segments.

6. A system for decomposing surfaces for rendering during computer graphics processing, comprising:
   a tessellation module for defining an interior mesh of primitives in a surface to be rendered, and a plurality of surrounding meshes along sides of the interior mesh;
   wherein exterior sides of the interior mesh each include a plurality of equally sized segments.

7. A computer program product for decomposing surfaces for rendering during computer graphics processing, comprising:

computer code for defining an interior mesh of primitives in a surface to be rendered; and computer code for defining a plurality of surrounding meshes along sides of the interior mesh;

wherein exterior sides of the interior mesh each include a plurality of equally sized segments.

8. A data structure for decomposing surfaces for rendering during computer graphics processing, comprising:

an interior mesh of primitives in a surface to be rendered; and a plurality of surrounding meshes along sides of the interior mesh;

wherein exterior sides of the interior mesh each include a plurality of equally sized segments.

9. A method for decomposing surfaces for rendering during computer graphics processing, comprising:

defining an interior mesh of primitives in a surface to be rendered; and defining a plurality of surrounding meshes along sides of the interior mesh;

wherein segments of at least one exterior side of the surrounding meshes are symmetric around a middle of the at least one exterior side of the surrounding meshes.

10. The method as recited in claim 9, wherein exterior sides of the interior mesh each include a plurality of equally sized segments.

11. The method as recited in claim 9, wherein segments of exterior sides of the interior mesh are symmetric around a middle of the exterior sides of the interior mesh.

12. The method as recited in claim 9, wherein each interior vertex of the interior mesh is connected to at least six other vertices of the interior mesh.

13. The method as recited in claim 9, wherein the segments of each exterior side of the surrounding meshes are symmetric around a middle of each exterior side of the surrounding meshes.

14. The method as recited in claim 9, wherein a spacing of vertices of the at least one exterior side of the surrounding meshes is symmetric around a middle of the at least one exterior side of the surrounding meshes.

15. A system for decomposing surfaces for rendering during computer graphics processing, comprising:

a tessellation module for defining an interior mesh of primitives in a surface to be rendered, and a plurality of surrounding meshes along sides of the interior mesh;

wherein segments of at least one exterior side of the surrounding meshes are symmetric around a middle of the at least one exterior side of the surrounding meshes.

16. A computer program product for decomposing surfaces for rendering during computer graphics processing, comprising:

computer code for defining an interior mesh of primitives in a surface to be rendered; and computer code for defining a plurality of surrounding meshes along sides of the interior mesh;

wherein segments of at least one exterior side of the surrounding meshes are symmetric around a middle of the at least one exterior side of the surrounding meshes.

17. A data structure for decomposing surfaces for rendering during computer graphics processing, comprising:

an interior mesh of primitives in a surface to be rendered; and a plurality of surrounding meshes along sides of the interior mesh;

wherein segments of at least one exterior side of the surrounding meshes are symmetric around a middle of the at least one exterior side of the surrounding meshes.

18. A method for decomposing surfaces for rendering during computer graphics processing, comprising:

defining an interior mesh of primitives in a surface to be rendered; and defining a plurality of surrounding meshes along sides of the interior mesh;

wherein segments of at least one exterior side of the interior mesh are symmetric around a middle of the at least one exterior side of the interior mesh.

19. The method as recited in claim 18, wherein segments of exterior sides of the surrounding meshes are symmetric around a middle of the exterior sides of the surrounding meshes.

20. The method as recited in claim 18, wherein each interior vertex of the interior mesh is connected to at least six other vertices of the interior mesh.

21. The method as recited in claim 18, wherein the segments of each exterior side of the interior mesh are symmetric around a middle of each exterior side of the interior mesh.

22. The method as recited in claim 18, wherein a spacing of vertices of the at least one exterior side of the interior mesh is symmetric around a middle of the at least one exterior side of the interior mesh.

23. The method as recited in claim 18, wherein the segments of the at least one exterior side of the interior mesh are symmetric around a middle of the at least one exterior side of the interior mesh.

24. A system for decomposing surfaces for rendering during computer graphics processing, comprising:

a tessellation module for defining an interior mesh of primitives in a surface to be rendered, and defining a plurality of surrounding meshes along sides of the interior mesh;

wherein segments of at least one exterior side of the interior mesh are symmetric around a middle of the at least one exterior side of the interior mesh.

25. A computer program product for decomposing surfaces for rendering during computer graphics processing, comprising:

computer code for defining an interior mesh of primitives in a surface to be rendered; and computer code for defining a plurality of surrounding meshes along sides of the interior mesh;

wherein segments of at least one exterior side of the interior mesh are symmetric around a middle of the at least one exterior side of the interior mesh.

26. A data structure for decomposing surfaces for rendering during computer graphics processing, comprising:

an interior mesh of primitives in a surface to be rendered; and a plurality of surrounding meshes along sides of the interior mesh;

wherein segments of at least one exterior side of the interior mesh are symmetric around a middle of the at least one exterior side of the interior mesh.

27. A method for decomposing surfaces for rendering during computer graphics processing, comprising:

defining an interior mesh of primitives in a surface to be rendered; and defining a plurality of surrounding meshes along sides of the interior mesh;

wherein each interior vertex of the interior mesh is connected to at least six other vertices of the interior mesh.

28. The method as recited in claim 27, wherein segments of exterior sides of the surrounding meshes are symmetric around a middle of the exterior sides of the surrounding meshes.

29. The method as recited in claim 27, wherein segments of exterior sides of the interior mesh are symmetric around a middle of the exterior sides of the interior mesh.

30. The method as recited in claim 27, wherein exterior sides of the interior mesh each include a plurality of equally sized segments.

31. The method as recited in claim 27, wherein each interior vertex of the interior mesh is connected to six other vertices of the interior mesh.

32. A system for decomposing surfaces for rendering during computer graphics processing, comprising:

a tessellation module for defining an interior mesh of primitives in a surface to be rendered, and defining a plurality of surrounding meshes along sides of the interior mesh;

wherein each interior vertex of the interior mesh is connected to at least six other vertices of the interior mesh.

33. A computer program product for decomposing surfaces for rendering during computer graphics processing, comprising:

computer code for defining an interior mesh of primitives in a surface to be rendered; and computer code for defining a plurality of surrounding meshes along sides of the interior mesh;

wherein each interior vertex of the interior mesh is connected to at least six other vertices of the interior mesh.

34. A data structure for decomposing surfaces for rendering during computer graphics processing, comprising:

an interior mesh of primitives in a surface to be rendered; and a plurality of surrounding meshes along sides of the interior mesh;

wherein each interior vertex of the interior mesh is connected to at least six other vertices of the interior mesh.

35. A method for decomposing surfaces for rendering during computer graphics processing, comprising:

defining an interior mesh of primitives in a surface to be rendered; and defining a plurality of surrounding meshes along sides of the interior mesh;

wherein each interior vertex of the interior mesh is connected to other vertices of the interior mesh to define a polygon.

\* \* \* \* \*